(12) United States Patent
Henry et al.

(10) Patent No.: US 12,506,597 B2
(45) Date of Patent: Dec. 23, 2025

(54) SECURE COMMUNICATION WITH A BACKSCATTER DEVICE

(71) Applicant: Cisco Technology, Inc., San Jose, CA (US)

(72) Inventors: Jerome Henry, Pittsboro, NC (US); Stephen M. Orr, Wallkill, NY (US); Robert E. Barton, Richmond (CA); Indermeet S. Gandhi, San Jose, CA (US)

(73) Assignee: Cisco Technology, Inc.

( * ) Notice: Subject to any disclaimer, the term of this patent is extended or adjusted under 35 U.S.C. 154(b) by 160 days.

(21) Appl. No.: 18/470,584

(22) Filed: Sep. 20, 2023

(65) Prior Publication Data
US 2024/0380574 A1    Nov. 14, 2024

Related U.S. Application Data

(60) Provisional application No. 63/502,087, filed on May 13, 2023.

(51) Int. Cl.
*H04L 9/08* (2006.01)

(52) U.S. Cl.
CPC .......... *H04L 9/0825* (2013.01); *H04L 9/0891* (2013.01); *H04L 9/0894* (2013.01)

(58) Field of Classification Search
CPC ... H04L 9/0825; H04L 9/0891; H04L 9/0894; H04L 9/3247
See application file for complete search history.

(56) References Cited

U.S. PATENT DOCUMENTS

| | | |
|---|---|---|
| 11,361,174 B1 | 6/2022 | Robshaw et al. |
| 2004/0128511 A1* | 7/2004 | Sun ............... H04L 9/3247 713/180 |
| 2006/0224902 A1* | 10/2006 | Bolt ............... G06F 21/10 713/193 |
| 2009/0187766 A1 | 7/2009 | Vuillaume et al. |
| 2017/0061174 A1 | 3/2017 | Butler et al. |
| 2018/0176771 A1* | 6/2018 | Yang ............... H04W 12/06 |

(Continued)

FOREIGN PATENT DOCUMENTS

WO    2015172632 A1    11/2015

OTHER PUBLICATIONS

International Search Report and Written Opinion for International Application No. PCT/US2024/028997, mailed Sep. 12, 2024, 11 Pages.

(Continued)

*Primary Examiner* — Henry Tsang
(74) *Attorney, Agent, or Firm* — Merchant & Gould P.C.

(57) ABSTRACT

Secure communication with a Backscatter Device (BKD) may be provided. A temporal key may be created. The temporal key and a network Identifier (ID) may be encrypted with a public key of a public private key pair associated with the BKD. An excitation frame including the encrypted temporal key and the encrypted network ID may be transmitted to the BKD. The AMP BKD may include a sensor. A BKD frame may be received from the BKD in response to the excitation frame. The BKD frame may include a sensor data encoded with the temporal key and the network ID as a target destination. The BKD frame may be signed using a private key of the public private key pair.

17 Claims, 6 Drawing Sheets

(56) References Cited

U.S. PATENT DOCUMENTS

2020/0076589 A1* 3/2020 Jeon ................... H04L 9/0894
2021/0248330 A1* 8/2021 Kawaguchi ........ G06K 7/10405
2021/0368439 A1 11/2021 Karimaruthumkal et al.

OTHER PUBLICATIONS

Kim Y-H., et al., "Implementation of Bistatic Backscatter Wireless Communication System Using Ambient Wi-Fi Signals", KSII Transactions on Internet and Information Systems, [Online], vol. 11, No. 2, Feb. 28, 2017, pp. 1250-1264, XP093195520, DOI: 10.3837/tiis.2017.02.036, Retrieved from https://koreascience.kr/article/JAKO201711656709754.pdf on Aug. 15, 2024, Figure 3, Abstract.
Xu Y., et al., "ecUWB: A Energy-Centric Communication Scheme for Unstable WiFi Based Backscatter Systems", 2020 29th International Conference on Computer Communications and Networks (ICCCN), IEEE, Aug. 3, 2020, 9 Pages, XP033833271, DOI: 10.1109/ICCCN49398.2020.9209721, figure 4, Sections IV-VI, figure 2, paragraphs [0020]-[0024], [0026].

* cited by examiner

SECURE COMMUNICATION WITH A BACKSCATTER DEVICE

RELATED APPLICATION

Under provisions of 35 U.S.C. § 119 (e), Applicant claims the benefit of U.S. Provisional Application No. 63/502,087, filed May 13, 2023, which is incorporated herein by reference.

TECHNICAL FIELD

The present disclosure relates generally to providing secure communication with a Backscatter Device (BKD).

BACKGROUND

In computer networking, a wireless Access Point (AP) is a networking hardware device that allows a Wi-Fi compatible client device to connect to a wired network and to other client devices. The AP usually connects to a router (directly or indirectly via a wired network) as a standalone device, but it can also be an integral component of the router itself. Several APs may also work in coordination, either through direct wired or wireless connections, or through a central system, commonly called a Wireless Local Area Network (WLAN) controller. An AP is differentiated from a hotspot, which is the physical location where Wi-Fi access to a WLAN is available.

Prior to wireless networks, setting up a computer network in a business, home, or school often required running many cables through walls and ceilings in order to deliver network access to all of the network-enabled devices in the building. With the creation of the wireless AP, network users are able to add devices that access the network with few or no cables. An AP connects to a wired network, then provides radio frequency links for other radio devices to reach that wired network. Most APs support the connection of multiple wireless devices. APs are built to support a standard for sending and receiving data using these radio frequencies.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
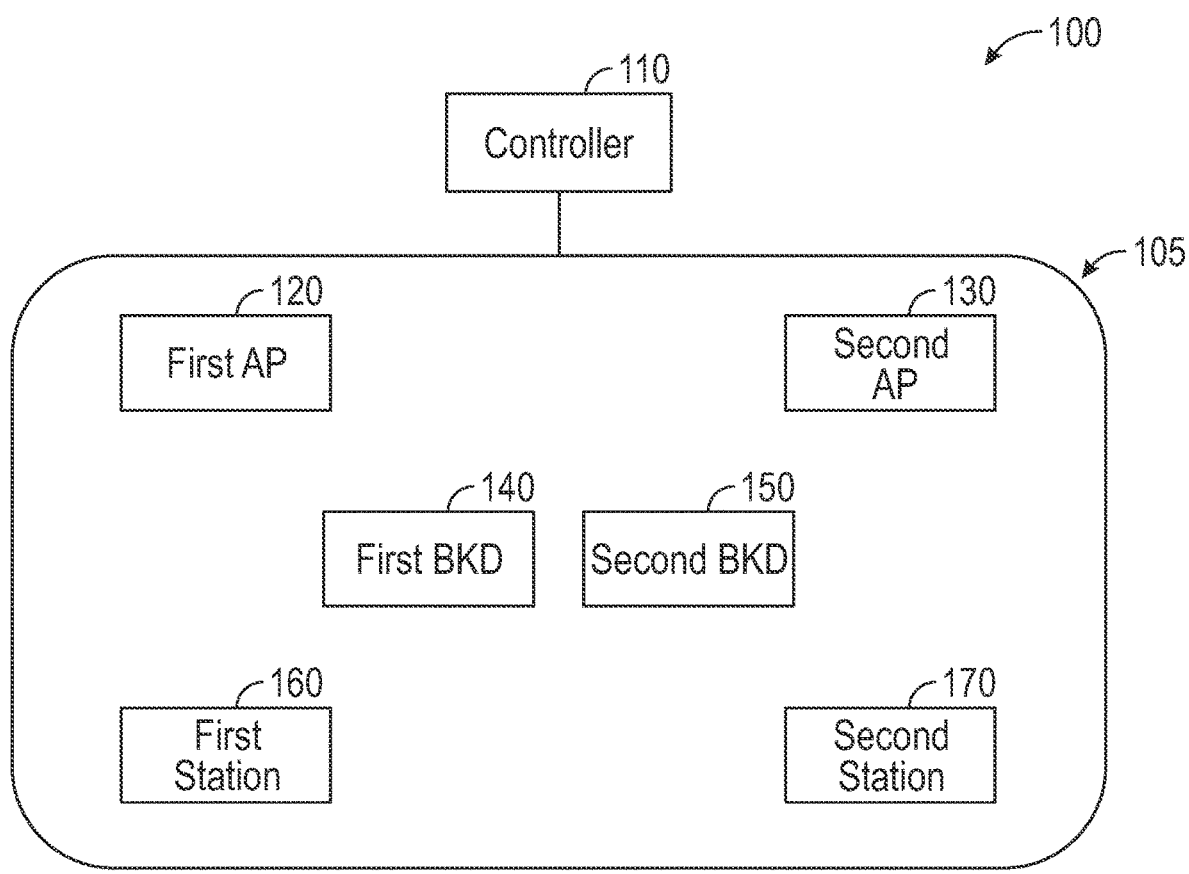
FIG. 1 is a block diagram of an operating environment for secure communication with a Backscatter Device (BKD)

Secure communication with a Backscatter Device (BKD) may be provided. A temporal key may be created. The temporal key and a network Identifier (ID) may be encrypted with a public key of a public private key pair associated with the BKD. An excitation frame including the encrypted temporal key and the encrypted network ID may be transmitted to the BKD. The BKD may include a sensor. A BKD frame may be received from the BKD in response to the excitation frame. The BKD frame may include a sensor data encoded with the temporal key and the network ID as a target destination. The BKD frame may be signed using a private key of the public private key pair.

Both the foregoing overview and the following example embodiments are examples and explanatory only and should not be considered to restrict the disclosure's scope, as described, and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Ambient Power (AMP) Backscatter Devices (BKDs) may use Radio Frequency (RF) signals to transmit data without a power source such as a battery or a connection to electricity. BKDs may use an antenna to receive RF signals, use the RF signals for excitation (e.g., convert the RF signals into electricity), and use the power to modify and reflect the RF signals with data. Other devices may receive a reflected RF signal transmitted by a BKD to process the data the BKD is sending. BKD operations may be described in documents and standards from the Institute of Electrical and Electronics Engineers (IEEE). For example, the IEEE AMP topic interest group and the IEEE 802.11 standard may describe the operations of BKDs.

There may be two types of BKDs: passive BKDs (pBKDs) and active BKDs (aBKDs). A pBKD may directly reflect back the energy it receives. An aBKD may include a capacitor and may thus charge until it sends its own frame. BKDs may include one or more sensors and encode data from the sensors in BKD frames it backscatters. As discussed above, BKDs may be powered by ambient energy (for example, RF signals) present in the surrounding environment. In the IEEE 802.111, one issue with BKDs to co-exist with other wireless devices may be secure onboarding of the BKDs in a network. Another issue may be related to security of frame exchanges with the BKDs. A rogue actor, for example, may replace an authorized BKD with a rogue BKD that may backscatter unauthorized or fake information. For example, an authorized door sensor may be substituted with a rogue door sensor that may report that a door is closed even when the door may be open. In another example, a rogue actor may even drop or listen to frames being sent by an authorized BKD to know the status of the door thereby compromising security. Thus, there may be a need to ensure that network devices may only consider frames transmitted by authorized BKDs and that the transmitted frames from the authorized BKDs may not be processed by rogue actors.

FIG. 1 is a block diagram of an operating environment 100 for secure communication with a BKD. Operating environment 100 may include a network 105 and a controller 110. Network 105 may include a plurality of network devices, for example, a first Access Point (AP) 120, a second AP 130, a first BKD 140, a second BKD 150, a first station 160, and a second station 170. Network 105 may comprise, but is not limited to, a Wireless Local Area Network (WLAN). Network 105 may also be referred to as a coverage environment.

Controller 110 may be a WLAN Controller (WLC) and provision and control network 105. Controller 110 may be implemented by a Digital Network Architecture Center (DNAC) controller (i.e., a Software-Defined Network (SDN) controller). Controller 110, first AP 120, and second AP 130 may provide a WLAN. Through this WLAN, first BKD 140, second BKD 150, first station 160, and second station 170 may be provided with access to the Internet or other cloud-based networking environments.

Each first AP 120 and second AP 130 may be compatible with specification standards such as, but not limited to, the Institute of Electrical and Electronics Engineers (IEEE) 802.11 specification standard for example. First AP 120 and second AP 130 may communicate with each other to conduct operations in concert. In addition, first AP 120 and second AP 130 may be devices that can send and receive signals to provide a connection to network 105.

First BKD 140 and second BKD 150 may be devices that may utilize signals first AP 120, second AP 130, first station 160, second station 170, and/or other network devices transmit to generate power, modulate or otherwise modify the received signals to encode data, and reflect the modulated signals. First BKD 140 and second BKD 150 may be user devices, Internet-of-Things (IoT) devices, sensors, and/or the like. Each of first BKD 140 and second BKD 150 may be a pBKD or an aBKD.

First station 160 and second station 170 may communicate with first AP 120, second AP 130, first BKD 140, and second BKD 150. In accordance with example embodiments, first station 160 and second station 170 may be devices with a constant power source, for example, a battery or connected to electrical power. First station 160 and second station 170 may also be referred to as helper devices as they may relay signals from first BKD 140 and second BKD 150 to first AP 120, second AP 130, or controller 110. First station 160 and second station 170 may be, for example, a smart phone, a personal computer, a tablet device, a mobile device, a telephone, a remote control device, a set-top box, a digital video recorder, an IoT device, a network computer, a router, an Automated Transfer Vehicle (ATV), a drone, an Unmanned Aerial Vehicle (UAV), or other similar microcomputer-based device.

The elements described above of operating environment 100 (e.g., controller 110, first AP 120, second AP 130, first BKD 140, second BKD 150, first station 160, and second station 170) may be practiced in hardware and/or in software (including firmware, resident software, micro-code, etc.) or in any other circuits or systems. The elements of operating environment 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of operating environment 100 may also be practiced using other technologies capable of performing logical operations such as, for example, AND, OR, and NOT, including but not limited to, mechanical, optical, fluidic, and quantum technologies. As described in greater detail below with respect to FIG. 6, the elements of operating environment 100 may be practiced in a computing device 600.

Figure 2:
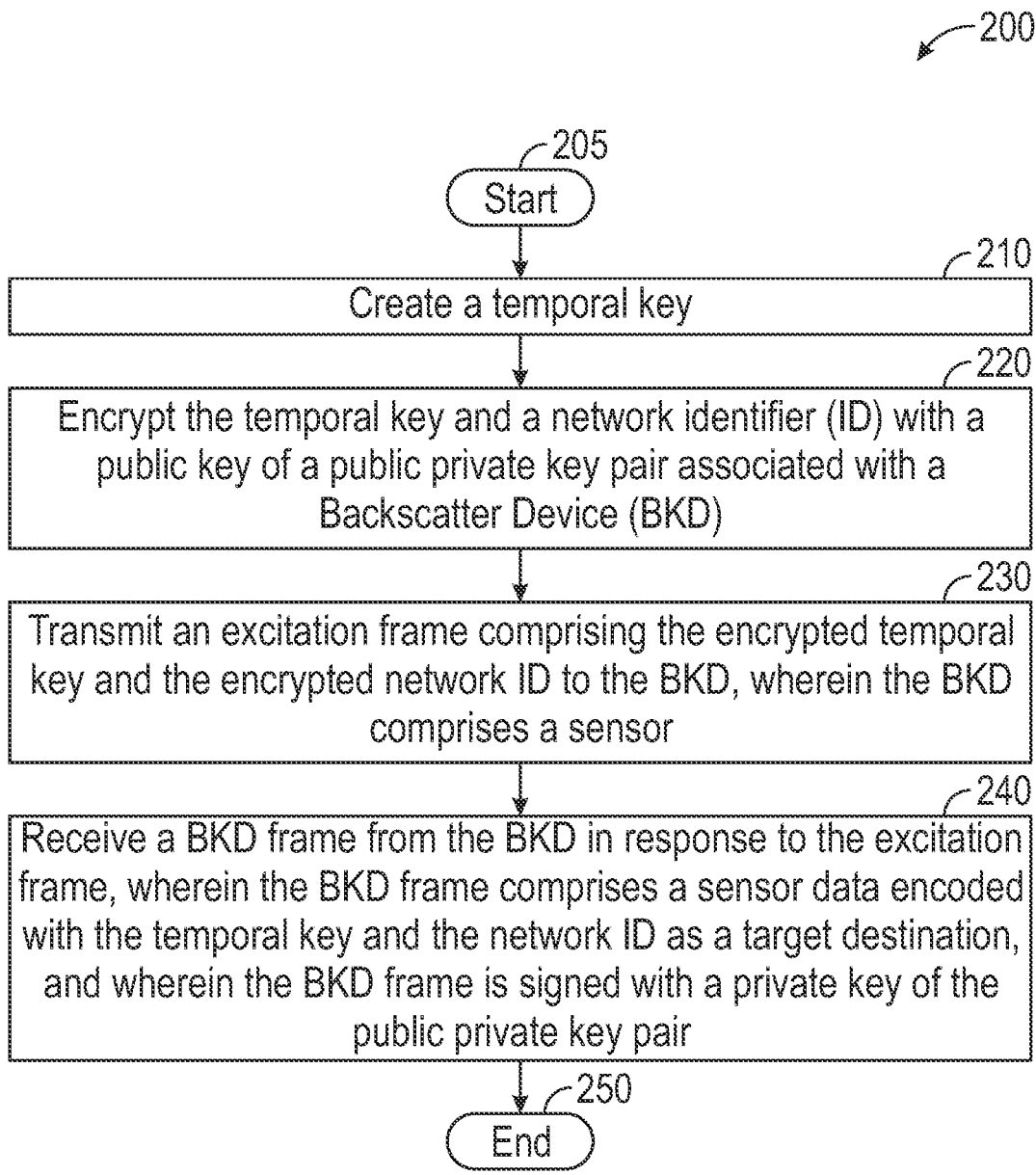
FIG. 2 is a flow chart of a first method for secure communication with a BKD.

FIG. 2 is a flow chart setting forth the general stages involved in a first method 200 consistent with embodiments of the disclosure for secure communication with a BKD, for example, first BKD 140. Method 200 may be implemented using first AP 120 as described in more detail above with respect to FIG. 1. However, method 200 may be implemented using any of controller 110, second AP 130, first station 160, and second station 170 as described in more detail above with respect to FIG. 1. Ways to implement the stages of method 200 will be described in greater detail below.

First BKD 140 may ship with a public private key pair or may have a mechanism to inscribe a public private key pair into it. The public private key pair may be inscribed into first BKD 140 though a Near-Field Communication (NFC) connection, a serial connection, etc. A private key of the public private key pair may be stored inside first BKD 140 on an internal memory, for example, a register. A public key of the public private key pair may be made available to or exchanged with other devices of network 105. The public key may be made available to the other devices through a barcode on first BKD 140, through a file, or other suitable mechanism. In one example, the public key may be uploaded to first AP 120 or controller 110. Controller 110 then may provide the public key to any network device joining network 105. In another example, the public key may be installed in an application on first station 160 and second station 170.

Method 200 may begin at starting block 205 and proceed to stage 210 where first AP 120 may create a temporal key. In some examples, the temporal key may be created by any of controller 110, second AP 130, first station 160, or second station 170 and made available to first AP 120. The temporal key may have a predefined self-life and a pre-defined length and complexity. The self-life may be of a short duration (for example, one or a few frame exchanges), a long duration (for example, never changed), or any length in between depending on an implementation choice. In some examples, the self-life, the length, and the complexity of the temporal key may depend on a processing power of first BKD 140 and a power budget comprising a power cost to change the temporal key in first BKD 140.

After creating the temporal key at stage 210, method 200 may proceed to stage 220 where first AP 120 may encrypt the temporal key and a network Identifier (ID) with the public key of the public private key pair associated with first BKD 140. The network ID may include a sorted list of identifiers of network devices of network 105 with which first BKD 140 may be configured or expected to communicate with. For example, the network ID may include a list of Media Access Code (MAC) addresses of one or more of controller 110, first AP 120, second AP 130, first station 160, and second station 170. In addition, the network ID may include one or more of Basic Service Set Identifier (BSSID) of first AP 120 and second AP 130.

Once having encrypted the temporal key and the network ID with the public key at stage 220, method 200 may proceed to stage 230 where first AP 120 may transmit an excitation frame having the encrypted temporal key and the encrypted network ID to first BKD 140. The encrypted temporal key and the network ID may be placed at a predetermined position in the excitation frame.

First BKD 140 may be configured to search for the temporal key and the network ID at the predetermined position. For example, first BKD 140 may be configured to expect the excitation frame as the excitation frame may be preceded by one or more charging frames. Receipt of the charging frames may indicate to first BKD 140 that a next frame may be the excitation frame. First BKD 140 may use the charging frames to attempt to decrypt the next frame with the private key to extract a temporal key and a network ID. Any next frame received after the charging frames that is not encrypted with the public key may be ignored by first BKD 140 as an unauthorized frame. In addition, any next frame that may be decrypted with the private key but does not contain a temporal key may also be ignored by first BKD 140 unless a temporal key is stored on first BKD 140. Moreover, any next frame that may be decrypted with the private key but contains a Target Address (TA) or a Source Address (SA) that is different than a network ID stored at first BKD 140 may be ignored by first BKD 140.

After transmitting the excitation frame at stage 230, method 200 may proceed to stage 240 where first AP 120 may receive the BKD frame from first BKD 140 in response to the excitation frame. The BKD frame may include the sensor data encoded with the temporal key and the network ID as a target destination. The BKD frame may be signed with the private key of the public private key pair. For example, after decrypting the excitation frame and determining that the source is legitimate, first BKD 140 may form or create the BKD frame. First BKD 140 may fetch a current or a most recent reading from a sensor of first BKD 140 as the sensor data. First BKD 140 may include a sensor, for example, a temperature sensor, a pressure sensor, a status sensor, etc.

The sensor data may then be encrypted with the temporal key received in the excitation frame. The encrypted sensor data may be placed in the BKD frame. First BKD 140 may also include the network ID received in the excitation frame as the target destination ID for the BKD frame. First BKD 140 may then encrypt or sign the BKD frame with the private key. First BKD 140 may then transmit or backscatter the BKD frame in network 105. First AP 120 may receive the BKD frame and may decrypt with the temporal key sent in the excitation frame. In addition, first AP 120 may use the public key of the public private key pair to validate that the BKD frame indeed came from first BKD 140. Once having received the BKD frame at stage 240, method 200 may terminate at end block 250.

Figure 3:
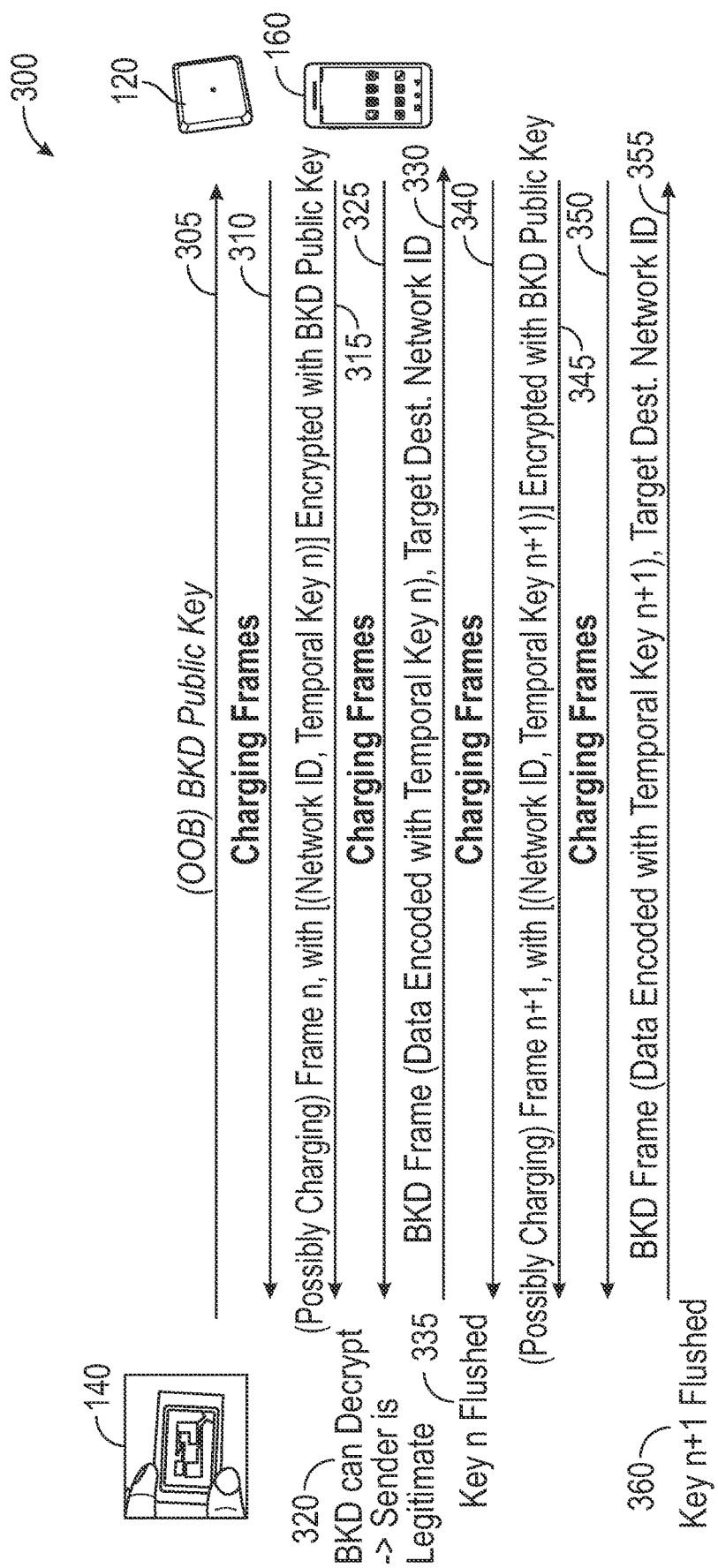
FIG. 3 is a diagram of a first process flow for secure communication with a BKD.

FIG. 3 is a diagram of a first process flow 300 setting forth operations involved in a secure communication between first BKD 140 and one of first AP 120 and first station 160 of network 105. At operation 305 of first process flow 300, first BKD 140 may provide the public key of the public private key associated with first BKD 140 to first AP 120 or first station 160. The public key may be received and retained at first AP 120 or first station 160.

At operation 310, first AP 120 or first station 160 may send charging frames to first BKD 140. The charging frames may energize first BKD 140. Once energized, first BKD 140 may, by configuration, expect to receive the excitation frame having an encrypted temporal key and a network ID in a subsequent frame or as a next frame. In some examples, first BKD 140 may, by configuration, expect any frame n to contain the encrypted temporal key and the network ID following an exchange of charging frames n−1. In addition, after receiving the charging frames, first BKD 140 may be set or configured to attempt to decrypt the subsequent frame with a private key stored on it and attempt to find the temporal key and the network ID at the predetermined position in the subsequent frame.

At operation 315, first AP 120 or first station 160 may, therefore, send the excitation frame (that is, frame n) after sending the charging frames at operation 310. As discussed above and shown in FIG. 3, the excitation frame (that is, the frame n) may include the encrypted temporal key and the network ID. The encrypted temporal key and the network ID may be placed at a predetermined position in the excitation frame. In some examples, the excitation frame may include one or more charging frames in first portions.

At operation 320, first BKD 140 may decrypt the excitation frame with the private key to extract the temporal key and network ID. First BKD 140 may determine that the sender of the excitation frame is legitimate based on the extracted temporal key and the network ID. Any received frame after the charging frames that is not encrypted with the public key may be ignored by first BKD 140 as an unauthorized frame. In addition, any received frame that may be decrypted with the private key but does not contain a temporal key may be ignored by first BKD 140 unless a temporal key is stored on first BKD 140. Moreover, any received frame that may be decrypted with the private key but contains a TA or a SA that is different than the network ID stored on first BKD 140 may be ignored by first BKD 140.

At operation 325, first AP 120 or first station 160 may send more or additional charging frames to first BKD 140 at operation 320. First BKD 140 may use the additional charging frames to form or create a BKD frame. As discussed above, the BKD frame may include the sensor data encoded with the temporal key and the network ID as the target destination ID. At operation 330, first BKD 140 may transmit or backscatter the BKD frame to first AP 120 or first station 160. After transmitting the BKD frame at operation 330, the temporal key may be flushed or deleted at operation 335. In example embodiments, a reset function may be provided into first BKD 140 that may cause first BKD 140 to flush its registers storing the temporal key. The reset function may be provided either as a physical button or a specific frame sequence, for example, a specific value for the encrypted temporal key.

After deletion of the temporal key from first exchanges, steps in operations 310 to 335 may be repeated for any subsequent exchange. For example, first AP 120 or first station 160 may send another charging frames at operation 340. These charging frames may be sent to re-energize first BKD 140. At operation 345, first AP 120 or first station 160 may send another excitation frame (that is, frame n+1). First BKD 140 may decrypt the excitation frame may to extract the temporal key and the network ID and determine that the sender is legitimate. At operation 350, first AP 120 or first station 160 may send additional charging frames to first BKD 140. First BKD 140 may use the additional charging frames to form a BKD frame. The BKD frame may include the updated sensor data encoded with the temporal key and the network ID as the target destination ID. At operation 355, first BKD 140 may transmit or backscatter the BKD frame to first AP 120 or first station 160. After transmitting the BKD frame at operation 355, first BKD 140 may flush the temporal key at operation 360.

In first process flow 300 (also referred to as a stateful process), first BKD 140 may have a register to store the temporal key. Thus, first BKD 140 may store the temporal key for a predetermined time period or for a predetermined number of exchanges. After completion of the predetermined time period or the predetermined number of exchanges, the temporal key may be flushed. However, some BKDs, may not have any register to store the temporal key. For such BKDs, charging frames and the temporal keys may be sent in a same frame or a single frame. Such single frame may include initial charging frames in first portions (or the beginning), encrypted temporal key and network ID in a subsequent portion, and additional charging frames in remaining portions.

Figure 4:
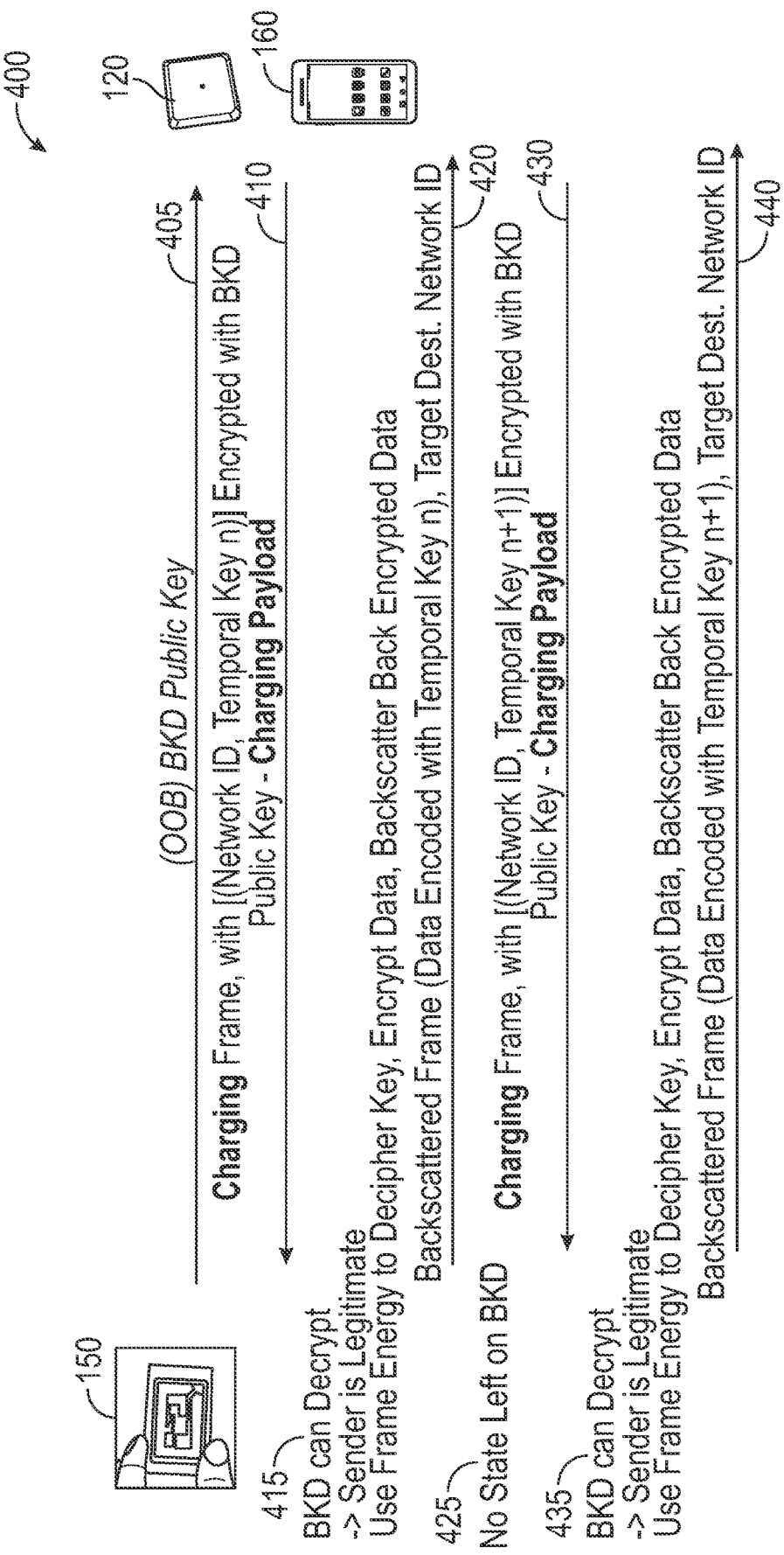
FIG. 4 is a diagram of a second process flow for secure communication with a BKD.

FIG. 4 illustrates a second process flow 400 setting forth operations involved in a secure communication between second BKD 150 and one of first AP 120 and first station 160. In examples, second BKD 150 may not have a register to store a temporal key, and therefore second process flow 400 may also be referred to as a stateless process.

At operation 405 of second process flow 400, second BKD 150 may provide a public key of the public private key pair associated with second BKD 150 to first AP 120 or first station 160. The public key may be received and retained at first AP 120 or first station 160.

At operation 410, first AP 120 or first station 160 may send an excitation frame. The excitation frame may include initial charging frames, a network ID and a temporal key encrypted with the public key of the public private key pair, and a charging payload. The charging payload may be additional charging frames with the encrypted temporal key and the encrypted network ID. Thus, the excitation may include at least two charging frames. A first charging frame of the at least two charging frames may be placed prior to both the encrypted temporal key and the encrypted network ID in the excitation frame. A second charging frame of the at least two charging frames may be placed after both the encrypted temporal key and the encrypted network ID in the excitation frame. Thus, the encrypted network ID and temporal key may be preceded by and followed by charging frames. The initial charging frames may energize second BKD 150. Once energized, second BKD 150 may, at operation 415, decrypt the encrypted temporal key and the network ID and determine that the sender is legitimate.

Second BKD 150 may use the additional charging frames to form a BKD frame. The BKD frame may include a sensor data from a sensor associated with second BKD 150 encoded with the temporal key. The BKD frame may further include a target destination as the network ID received in the excitation frame. At operation 420, second BKD 150 may send the BKD frame to first AP 120 or first station 160. After sending the BKD frame to first AP 120 or first station 160 at operation 420, at operation 425 no state may be left at second BKD 150.

Thus, in second process flow 400, second BKD 150 may be stateless and may be passive. That is, second BKD 150 may receive excitation frame including the encrypted temporal key and the network ID, process the excitation frame, encrypt the sensor data, and backscatter the sensor data through effect of the additional charging frames and then return to a mode where no key or other element may be stored in an internal memory. As a result, second BKD 150 may not need additional memory to communicate with other devices in the network.

After completion of first exchanges, steps in operations 410 to 420 may be repeated for any subsequent exchanges. For example, at operation 430, first AP 120 or first station 160 may send another excitation frame. The excitation frame may include initial charging frames, a network ID and a temporal key encrypted with a public key of the public private key pair, and a charging payload that may be additional charging frames. The initial charging frames may re-energize second BKD 150. Once re-energized, second BKD 150 may, at operation 435, decrypt the encrypted temporal key and the network ID and determine that the sender is legitimate. Second BKD 150 may use the additional charging frames to form a BKD frame. The BKD frame may include an updated sensor data from the sensor associated with second BKD 150 encoded with the temporal key. The BKD frame may further include a target destination as the network ID received in the excitation frame. At operation 440, second BKD 150 may send the BKD frame to first AP 120 or first station 160.

Figure 5:
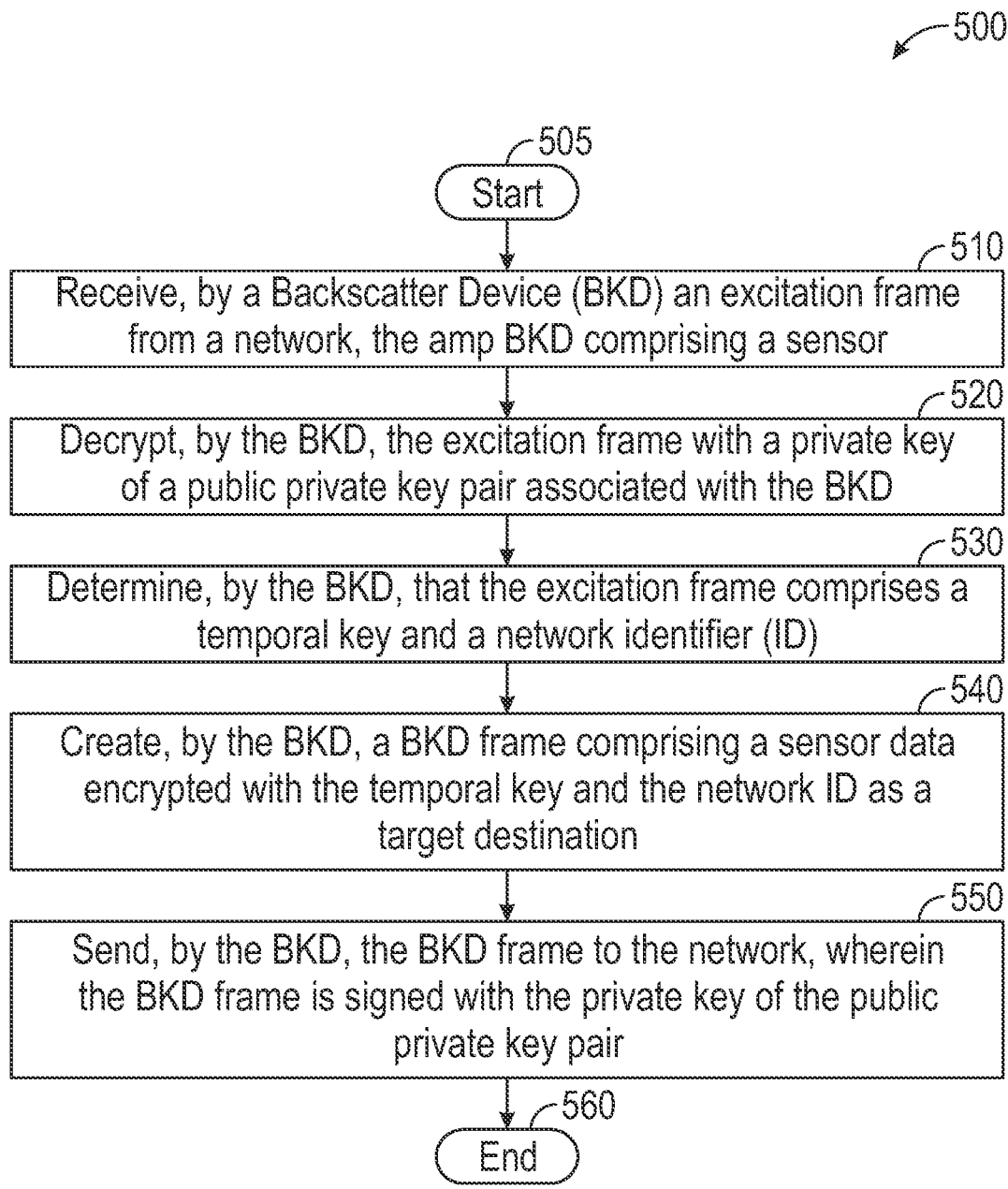
FIG. 5 is a flow chart of a second method for secure communication by a BKD.

FIG. 5 is a flow chart setting forth the general stages involved in a second method 500 consistent with embodiments of the disclosure for secure communication by a BKD. Method 500 may be implemented using first BKD 140 as described in more detail above with respect to FIG. 1. However, method 500 may also be implemented using second BKD 150 as described in more detail above with respect to FIG. 1. Ways to implement the stages of method 500 will be described in greater detail below.

Method 500 may begin at starting block 505 and proceed to stage 510 where first BKD 140 may receive an excitation frame from network 105. The excitation frame may be emitted by one of first AP 120 or second AP 130. First BKD 140 may include a sensor, for example, a temperature sensor that can detect a current temperature at a location.

After receiving the excitation frame at stage 510, method 500 may proceed to stage 520 where first BKD 140 may decrypt the excitation frame with the private key of the public private key associated with first BKD 140. Once having decrypted the excitation frame at stage 520, method 500 may proceed to stage 530 where first BKD 140 may determine that the excitation frame includes a temporal key and a network ID. First BKD 140 may also determine that a sender of the excitation frame is legitimate based on decrypting the excitation frame.

After determining that the excitation frame includes the temporal key and the network ID at stage 530, method 500 may proceed to stage 540, where first BKD 140 may create a BKD frame including the sensor data encrypted with the temporal key and the network ID as a target destination. Once having created the BKD frame at stage 540, method 500 may proceed to stage 550 where first BKD 140 may send the BKD frame to network 105. First BKD 140 may sign the BKD frame with the private key of the public private key pair. After sending the BKD frame at stage 550, method 500 may terminate at end block 560.

Figure 6:
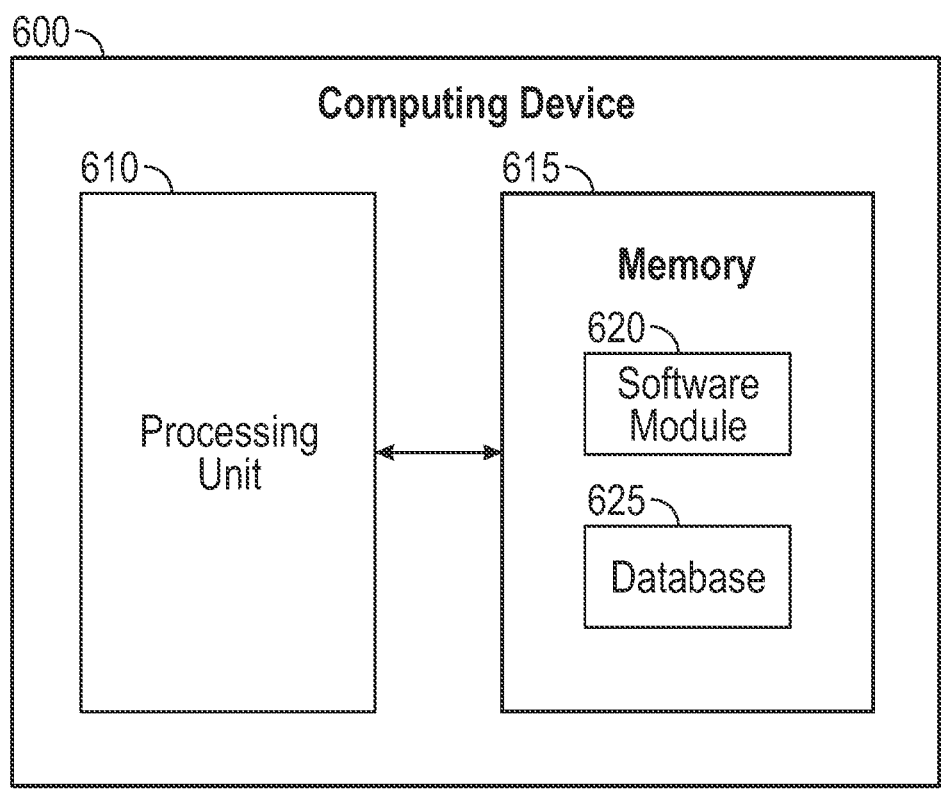
FIG. 6 is a block diagram of a computing device.

FIG. 6 is a block diagram of a computing device 600. As shown in FIG. 6, computing device 600 may include a processing unit 610 and a memory unit 615. Memory unit 615 may include a software module 620 and a database 625. While executing on processing unit 610, software module 620 may perform, for example, processes for secure communication with an AMP BKD described with respect to FIG. 2, FIG. 3, FIG. 4, and FIG. 5. Computing device 600, for example, may provide an operating environment for controller 110, first AP 120, second AP 130, first BKD 140, second BKD 150, first station 160, and second station 170, and the like. Controller 110, first AP 120, second AP 130, first BKD 140, second BKD 150, first station 160, and second station 170, and the like may operate in other environments and are not limited to computing device 600.

Computing device 600 may be implemented using a Wi-Fi access point, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay device, or other similar microcomputer-based device. Computing device 600 may comprise any computer operating environment, such as hand-held devices, multiprocessor systems, microprocessor-based or programmable sender electronic devices, minicomputers, mainframe computers, and the like. Computing device 600 may also be practiced in distributed computing environments where tasks are performed by remote processing devices. The aforementioned systems and devices are examples, and computing device 600 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on, or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 600 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

The invention claimed is:

1. A method comprising:
   creating a temporal key;
   encrypting the temporal key and a network Identifier (ID) with a public key of a public private key pair associated with a Backscatter Device (BKD) wherein the network ID comprises a sorted list of device identifiers of network devices of a network the BKD is configured to communicate with;
   transmitting an excitation frame comprising the encrypted temporal key and the encrypted network ID to the BKD, wherein the BKD comprises a sensor; and
   receiving a BKD frame from the BKD in response to the excitation frame, wherein the BKD frame comprises a sensor data encoded with the temporal key and the network ID as a target destination, and wherein the BKD frame is signed with a private key of the public private key pair.

2. The method of claim 1, further comprising:
   creating the public private key pair comprising the private key and the public key;
   storing the private key on a memory on the BKD; and
   providing the public key to devices associated with the network ID, the device comprising one or more of the following: a Wireless Local Area Network (LAN) Controller (WLC), an Access Point (AP), and a station of a network.

3. The method of claim 1, wherein creating the temporal key comprises creating the temporal key with a predetermined self-life, and wherein the temporal key is flushed after the predetermined self-life.

4. The method of claim 1, wherein transmitting the excitation frame comprising the encrypted temporal key comprises transmitting the excitation frame comprising the encrypted temporal key placed at a predefined position in the excitation frame.

5. The method of claim 1, further comprising:
decrypting the BKD frame with the temporal key; and
validating the BKD frame with the public key of the public private key pair.

6. The method of claim 1, further comprising:
transmitting a first charging frame prior to transmitting the excitation frame; and
transmitting a second charging frame after transmitting the excitation frame.

7. The method of claim 1, wherein transmitting the excitation frame comprises transmitting the excitation frame comprising at least two charging frames with the encrypted temporal key and the encrypted network ID, wherein a first charging frame of the at least two charging frames is placed prior to both the encrypted temporal key and the encrypted network ID in the excitation frame, and wherein a second charging frame of the at least two charging frames is placed after both the encrypted temporal key and the encrypted network ID in the excitation frame.

8. A method comprising:
receiving, by a Backscatter Device (BKD), an excitation frame from a network, the BKD comprising a sensor;
decrypting, by the BKD, the excitation frame with a private key of a public private key pair associated with the BKD;
determining, by the BKD, that the excitation frame comprises a temporal key and a network Identifier (ID) wherein determining that the excitation frame comprises the temporal key further comprises ignoring the excitation frame in response to determining that the excitation frame does not comprise the temporal key;
creating, by the BKD, a BKD frame comprising a sensor data encrypted with the temporal key and the network ID as a target destination; and
sending, by the BKD, the BKD frame to the network, wherein the BKD frame is signed with the private key of the public private key pair.

9. The method of claim 8, further comprising:
receiving, by the BKD, the private key of the public private key pair.

10. The method of claim 8, further comprising:
storing the temporal key in a memory; and
flush the temporal key after expiry of a self-life associated with the temporal key.

11. The method of claim 8, further comprising:
flushing the temporal key after sending the BKD frame.

12. The method of claim 8, further comprising:
receiving a charging frame prior to receiving the excitation frame.

13. A system comprising:
a memory storage; and
a processing unit coupled to the memory storage, wherein the processing unit is operative to:
create a temporal key;
encrypt the temporal key and a network Identifier (ID) with a public key of a public private key pair associated with a Backscatter Device (BKD);
transmit an excitation frame comprising the encrypted temporal key and the encrypted network ID to the BKD, wherein the BKD comprises a sensor; and
receive a BKD frame from the BKD in response to the excitation frame, wherein the BKD frame comprises a sensor data encoded with the temporal key and the network ID as a target destination, and wherein the BKD frame is signed using a private key of the public private key pair wherein the excitation frame further comprises at least two charging frames, wherein a first charging frame of the at least two charging frames is placed prior to both the encrypted temporal key and the encrypted network ID in the excitation frame, and wherein a second charging frame of the at least two charging frames is placed after both the encrypted temporal key and the encrypted network ID in the excitation frame.

14. The system of claim 13, wherein the processing unit is further operative to:
decrypt the BKD frame with the temporal key; and
validate the BKD frame with the public key of the pubic private key pair.

15. The system of claim 13, wherein the encrypted temporal key is placed at a predefined position in the excitation frame.

16. The system of claim 13, wherein the network ID comprises a sorted list of device identifiers of network devices of a network the BKD is configured to communicate with.

17. The system of claim 13, wherein the processing unit is further operative to: flush the temporal key after expiry of a self-life associated with the temporal key.

* * * * *